United States Patent [19]

Philipp et al.

[11] 4,154,912

[45] May 15, 1979

[54] IN SITU SELF CROSS-LINKING OF POLYVINYL ALCOHOL BATTERY SEPARATORS

[75] Inventors: Warren H. Philipp, North Olmsted; Li-Chen Hsu, Cleveland; Dean W. Sheibley, Sandusky, all of Ohio

[73] Assignee: The United States of America as represented by the Administrator of the National Aeronautics and Space Administration, Washington, D.C.

[21] Appl. No.: 897,829

[22] Filed: Apr. 19, 1978

[51] Int. Cl.² ............................................. C08F 8/28
[52] U.S. Cl. ..................................... 526/7; 429/253; 526/9
[58] Field of Search ..................... 526/7, 9; 429/253

[56] References Cited

U.S. PATENT DOCUMENTS

| | | | |
|---|---|---|---|
| 2,983,759 | 5/1961 | Matsumoto et al. | 526/7 |
| 3,052,662 | 9/1962 | Shiraishi et al. | 526/7 |
| 3,379,703 | 4/1968 | Ehmann et al. | 526/9 |

OTHER PUBLICATIONS

Poly(vinylalcohol), Pritchard, J. G., (1970), pp. 85 & 86.

*Primary Examiner*—Stanford M. Levin
*Attorney, Agent, or Firm*—Norman T. Musial; John R. Manning; James A. Mackin

[57] ABSTRACT

A battery separator is produced from a polyvinyl alcohol sheet structure which is subjected to an in situ, self cross-linking process by selective oxidation of the 1,2 diol units present in the polyvinyl alcohol sheet structure. The 1,2 diol units are cleaved to form aldehyde end groups which subsequently cross-link through acetalization of the 1,3 diol units of the polyvinyl alcohol. Selective oxidation is achieved using a solution of a suitable oxidizing agent such as periodic acid or lead tetraacetate.

8 Claims, No Drawings

IN SITU SELF CROSS-LINKING OF POLYVINYL ALCOHOL BATTERY SEPARATORS

ORIGIN OF THE INVENTION

The invention described herein was made by employees of the United States Government and may be manufactured and used by or for the Government for governmental purposes without the payment of any royalties thereon or therefor.

FIELD OF THE INVENTION

The present invention relates to a polyvinyl alcohol sheet structure and a method for producing such a sheet structure and, more specifically, to a method for the in situ self cross-linking of polyvinyl alcohol which is particularly useful in producing battery separator films.

BACKGROUND OF THE INVENTION

The use of polyvinyl alcohol as a separator material in alkaline batteries is well known. A standard electrolyte for alkaline batteries is concentrated aqueous potassium hydroxide. Although polyvinyl alcohol is soluble in water, it is not readily dissolved in such a concentrated potassium hydroxide solution, and thus, films of this material can be used in such electrolytes. In general, polyvinyl alcohol films have been utilized as battery separators because of their high conductivity in alkaline electrolytes and their ease of fabrication from aqueous solution.

Efforts have been made to improve the mechanical properties and chemical stability of polyvinyl alcohol by synthesizing numerous derivatives of the polymer. However, the number of processes for the in situ reaction of prefabricated polyvinyl alcohol structures, such as battery separators, is limited. The in situ acetalization of polyvinyl alcohol separators has been achieved through treatment of the separators with acid solutions of aldehydes, such as an aqueous formaldehyde solution containing a small amount of sulfuric acid. The aldehyde acetalates the 1,3 diol units present in the polymer thereby creating tough, water insoluble derivatives. In many of the aldehyde treatments, the extent of acetalization is difficult to control. Extensive acetalization of polyvinyl alcohol leads to poor conductivity in alkaline electrolyte, which is probably due to the decreased number of hydrophilic alcohol groups resulting from the using up of such groups by the acetalization reaction. In addition, commercially available polyvinyl alcohol normally contains approximately from 0.5% to 6%, but may be made to contain up to 20% of 1,2 diol units in the predominantly 1,3 diol polymer structures. These chemically reactive 1,2 diol units are still present in the chain and can lead to poor oxidation resistance of the polymer.

Reference is also made to U.S. Pat. No. 2,983,759 (Matsumoto et al) which mentions the preparation of polyvinyl alcohol having terminal carbonyl groups by oxidizing the polyvinyl alcohol with an agent such as periodic acid or lead tetraacetate whereby 1,2 glycol groups in the polyvinyl alcohol are cleaved and oxidized to carbonyl groups.

SUMMARY OF THE INVENTION

The invention relates to a process for the in situ cross-linking of a prefabricated polyvinyl alcohol sheet structure which (i) provides an amount of cross-linking (by acetalization) to an extent determined by the amount of 1,2, diol units in the sheet structure prior to cross-linking; (ii) provides for a product having high conductivity; and (iii) minimizes the number of 1,2 diol units retained in the polyvinyl alcohol polymer chain, thereby producing a sheet structure which is particularly useful as a separator for an alkaline battery.

In accordance with the invention, a self cross-linked prefabricated polyvinyl alcohol sheet structure is provided by: contacting a prefabricated sheet structure containing polyvinyl alcohol and containing diol units, of which 0.5 to 20% are 1,2, diol units, with an oxidizing agent capable of selectively oxidizing and cleaving the 1,2 diol units present in the structure; maintaining contact between the sheet structure and the oxidizing agent for a time sufficient to effect selective oxidative cleavage of the 1,2, diol units to form aldehydes; contacting the sheet structure with an aqueous acid solution to catalyze acetalization, using the aldehydes, of 1,3 diol units in the polyvinyl alcohol. The acetalization reaction effects cross-linking of the polyvinyl alcohol and, since the aldehyde units utilized to effect the cross-linking are derived from the prefabricated sheet structure itself, the product is self cross-linked.

The cross-linking of the relatively water soluble polyvinyl alcohol makes the sheet material water insoluble and establishes greater mechanical strength. Moreover, oxidation resistance is maintained since the 1,2, diol units are removed. In addition, since the degree of acetalization is determined by the amount of 1,2 diol units present in the polyvinyl alcohol, it is readily controlled by adjusting the content of 1,2 diol units in the polyvinyl alcohol sheet structure. This can be easily accomplished by selection of a polyvinyl alcohol containing an appropriate 1,2 diol content, by intentionally producing polyvinyl alcohol with a high 1,2 diol content, by introducing 1,2 diol compounds into the sheet structure, or by combination of these techniques. Low conductivity resulting from extensive acetalization can thereby be avoided.

Other features and advantages of the invention will be set forth in, or apparent from, the detailed description of the preferred embodiments found hereinbelow.

DESCRIPTION OF THE PREFERRED EMBODIMENTS

Commercially available polyvinyl alcohol, although essentially a 1,3 diol, may be made to contain up to approximately 20% 1,2 diol units in its polymer structure. These 1,2 diol units are readily cleaved under oxidizing conditions using certain oxidizing reagents which oxidize and cleave the 1,2 diol to produce specific formation of aldehyde end groups. Periodic acid and lead tetraacetate are well established reagents for achieving this result. Other oxidizing agents may also be used provided they involve an oxidation level reduction of two. The selective oxidative cleavage of the 1,2 diol units of the polyvinyl alcohol may be represented by the following equation:

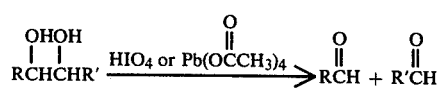

wherein R and R' represent the repetitive 1,3 diol units making up the chain structure of the polyvinyl alcohol. It is known that aldehyde groups in acid media can undergo acetalization with 1,3 diols. Therefore, once the 1,2 diol units of the polyvinyl alcohol are cleaved, thereby forming polyvinyl alcohol fragments with aldehyde end groups, these fragments can acetalate the 1,3 diol units of the polyvinyl alcohol to produce polymer chains with cross-linking. Since the polyvinyl alcohol chain structure may contain up to 20% 1,2 diol units, the polyvinyl alcohol fragments are produced primarily as dialdehydes, wherein each aldehyde end group is the oxidized form of one of the alcohols of a 1,2 diol. Thus, the acetalization reaction resulting in the self cross-linking of the polyvinyl alcohol film is represented by the following equation:

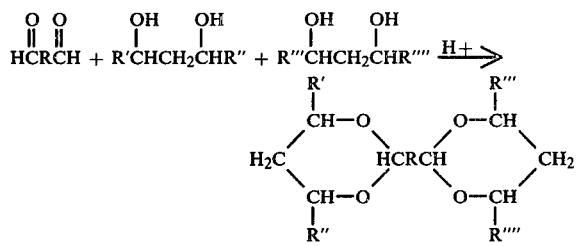

wherein R represents the polyvinyl alcohol fragment with aldehyde end groups, and wherein R', R", R''' and R'''' represent the chain structure of the polyvinyl alcohol with repetitive 1,3 diol units.

The method of the present invention accomplishes the cleavage and cross-linking through acetalization in a simple, controlled manner. A typical cross-linking aqueous treatment solution contains periodic acid as the selective oxidizing agent, an acid (preferably a mineral acid, such as sulfuric acid) for catalyzing the acetalization, and an unreactive salt, such as sodium sulfate, which functions to salt out or insolubilize the polyvinyl alcohol in order to inhibit distortion of the fabricated separator until cross-linking is complete. This salt does not take part in the reactive process itself. While periodic acid is the most convenient oxidizing agent in aqueous systems, other oxidizers may be used, provided they involve an oxidation level reduction of two.

The method of the invention can alternatively be carried out utilizing lead tetraacetate as the selective oxidizing agent. In this case, the polyvinyl alcohol is treated in a non-aqueous, acidic solution containing lead tetraacetate, (e.g. a glacial acetic acid solution) followed by treatment using an aqueous solution containing an acid catalyst for acetalization and an unreactive salt. Use of an aqueous reaction solution is preferred since organic solvents are not necessary and thus the hazards of flammability and toxicity associated with organic liquids are avoided. In this way, all operations, including casting of a polyvinyl alcohol film or impregnating a matrix with polyvinyl alcohol in addition to the cross-linking treatment of the present invention, may be accomplished by the appropriate aqueous solution. Another advantage of the present invention is that the cross-linking can be done on the already-fabricated polyvinyl alcohol separator, such as an electrode envelope, without significant distortion of the fabricated separator.

The polyvinyl alcohol compounds contemplated for use in the present invention may contain 1,2 diol units in an amount of 0.5% to as much as 20% of the total number of diol units present in the polymer (with the remainder being predominantly 1,3 diol units). The 1,2 diol content of the polyvinyl alcohol depends primarily on the polymerization temperature used during the formation of the precursor polyvinyl acetate. Higher polymerization temperatures produce a greater proportion of head to head units formed in the chain. The head to head structure of the precursor, poly(vinyl acetate) leads to the 1,2 diol units in poly(vinyl alcohol). The 1,2 diol content of the polyvinyl alcohol can be selected to provide for various levels of cross-linking in the final product, which, in turn, results in varying degrees of toughness, solubility, resistance and other properties of the separator. A 1,2 diol content of 1 to 6% has been found to provide desirable overall qualities for battery separator use.

Additional 1,2 diol compounds may be combined with the polyvinyl alcohol, in an amount of up to 20% by weight of the polyvinyl alcohol, to increase the 1,2 diol content and provide additional cross-linking components or form polyvinyl alcohol derivatives. Such compounds include the 1,2 diols of alkanes and substituted alkanes such as 1,2 ethane diol, 1,2 propane diol, 1,2 butane diol, 2,3 butane diol, and diols of longer chain molecules. The term "1,2 diol" used herein means that a hydrogen atom of adjacent carbon atoms are substituted by a hydroxyl group. This is to distinguish from a "1,3 diol" in which a carbon atom separates the carbon atoms to which the hydroxyl groups are attached. Thus, used herein, an "alkane 1,2 diol" is an alkane having hydroxyl substitution on two adjacent carbon atoms in the alkane, irrespective of whether those carbon atoms are normally numbered "1" and "2".

The periodic acid selective oxidizing agent used in the present invention includes its salts, especially the alkali metal salts, which also contain iodine in the 7+ oxidation state. These compounds are typically derived from the metaperiodic acid, $HIO_4$, and include sodium metaperiodate, $NaIO_4$, and potassium metaperiodate, $KIO_4$.

Unreactive salts used in the present invention include the salts of alkali earth metals, alkali metals, ammonium, and like cations, and anions such as sulphate. Typical salts are sodium sulfate, $Na_2SO_4$, potassium sulfate, $K_2SO_4$ ammonium sulphate, $(NH_4)_2SO_4$, and related compounds.

The following examples illustrate the present invention:

EXAMPLE 1

A polyvinyl alcohol film with approximately 6% 1,2 diol units, of the total amount of diol units, of about 150μ in thickness is immersed in a solution containing:

| | |
|---|---|
| Water | 1000 ml |
| $Na_2SO_4$ | 200 gm |
| Conc. $H_2SO_4$ | 50 ml |
| $NaIO_4$ or $KIO_4$ | 24–50 gm | at a temperature of 70° to 90° C. After an hour, the film is removed from the solution, washed with water, and then washed with dilute aqueous sodium bicarbonate, $NaHCO_3$, to neutralize absorbed acid, and finally washed with water again to remove salts. The film is then dried at room temperature.

A polyvinyl alcohol film containing a self cross-linked structure is produced, exhibiting high conductivity and oxidation resistance, and minimal distortion of the film.

EXAMPLE 2

A polyvinyl alcohol film containing about 96% polyvinyl alcohol and about 4% 1,2 propane diol is treated as in Example 1. The polyvinyl alcohol has about 1% diol units in its molecular structure. The product is a self cross-linked polyvinyl alcohol structure exhibiting high conductivity and oxidation resistance, and minimal distortion of the film.

EXAMPLE 3

A polyvinyl alcohol film with approximately 6% 1,2 diol units of about 150 μ thickness is immersed in a 5% lead tetraacetate solution in glacial acetic acid for an hour, at about 90° C. The film is then removed and immersed in a solution containing:

| | |
|---|---|
| Water | 1000 ml |
| $Na_2SO_4$ | 200 gm |
| conc. $H_2SO_4$ | 50 ml | to complete the acetalization. The film is then washed and dried, following the procedure in the previous examples, to provide a self cross-linked polyvinyl alcohol structure exhibiting high conductivity and oxidation resistance, and minimal distortion of the film.

Although the invention has been described relative to exemplary embodiments thereof, it will be understood that other variations and modifications can be effected in these embodiments without departing from the scope and spirit of the invention.

What is claimed is:

1. A method for the self cross-linking of a prefabricated polyvinyl alcohol sheet structure comprising:
   contacting a prefabricated sheet structure comprising polyvinyl alcohol containing diol units, of which units 0.5 to 20% are 1,2 diol units, with an oxidizing agent capable of selectively oxidizing and cleaving the 1,2 diol units present in the structure;
   maintaining contact between said sheet structure and said oxidizing agent for a time sufficient to effect selective oxidative cleavage of said 1,2 diol units to form aldehydes;
   contacting said sheet structure with an aqueous acid solution to catalyze acetalization, using said aldehydes, of 1,3 diol units in the polyvinyl alcohol to form a self cross-linked prefabricated polyvinyl alcohol sheet structure, said aqueous acid solution comprising an aqueous solution containing an unreactive water soluble salt dissolved therein, the amount of said salt being sufficient to inhibit distortion of the polyvinyl alcohol sheet structure in said aqueous solution.

2. A method according to claim 1 wherein said contacting of said sheet structure with said oxidizing agent, said maintaining of contact to effect selective oxidative cleavage of said 1,2 diol units to form aldehydes, and said contacting of said sheet structure with said aqueous acid solution, are effected simultaneously.

3. A method according to claim 1 wherein said sheet structure includes at least one additional compound containing 1,2 diol units, the amount of said compound being up to 20% by weight of the polyvinyl alcohol.

4. A method according to claim 3 wherein said additional compound comprises an alkane 1,2 diol.

5. A method according to claim 4 wherein said additional compound comprises 1,2 propane diol.

6. A method according to claim 1 wherein said oxidizing agent is selected from the group consisting of periodic acid, lead tetraacetate and alkali metal periodates.

7. A polyvinyl alcohol sheet material comprising polyvinyl alcohol substantially free of 1,2 diol units and having an acetal self cross-linked structure wherein the acetal content is determined by the 1,2 diol content in the sheet material prior to cross-linking and wherein said 1,2 diol content is from 0.5 to 20% of the total amount of diol units present in the polyvinyl alcohol prior to cross-linking, said sheet material comprising at least one additional 1,2 diol compound in an amount up to 20% by weight of the polyvinyl alcohol.

8. A polyvinyl alcohol sheet material according to claim 7 wherein the polyvinyl alcohol has the structural formula:

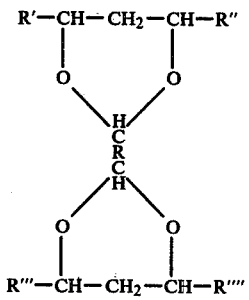

wherein R represents a polyvinyl alcohol chain fragment with aldehyde end groups, and wherein R', R", R'" and R"" represent the chain structure of the polyvinyl alcohol with repetitive 1,3 diol units.

* * * * *